(12) United States Patent
Saxena et al.

(10) Patent No.: US 7,167,309 B2
(45) Date of Patent: Jan. 23, 2007

(54) OPTICAL COMPENSATION OF COVER GLASS-AIR GAP-DISPLAY STACK FOR HIGH AMBIENT LIGHTING

(75) Inventors: Ragini Saxena, Simi Valley, CA (US); Ban S. Bong, Calabasas, CA (US); Steven E. Havelka, Los Angeles, CA (US); Thomas Loo, Calabasas, CA (US); Albert V. Scappaticci, Calabasas, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/877,329

(22) Filed: Jun. 25, 2004

(65) Prior Publication Data

US 2005/0286131 A1 Dec. 29, 2005

(51) Int. Cl.
*G02B 1/10* (2006.01)
(52) U.S. Cl. .................. 359/586; 359/587; 359/585
(58) Field of Classification Search ................ 359/586, 359/587, 580, 585; 349/96
See application file for complete search history.

(56) References Cited

U.S. PATENT DOCUMENTS 6,181,394 B1   1/2001 Sanelle et al. ............... 349/96
6,392,727 B1   5/2002 Larson et al.
2002/0167629 A1   11/2002 Blanchard .................. 349/112
2004/0095332 A1   5/2004 Blanchard .................. 345/173

FOREIGN PATENT DOCUMENTS

EP           0010796           5/1980

OTHER PUBLICATIONS

International Search Report and Written Opinion for corresponding international application No. PCT/US2005/07250, mailed Sep. 1, 2005.

*Primary Examiner*—Fayez G. Assaf

(57) ABSTRACT

Apparatus and methods relating to display stacks wherein one or more index matching layers are utilized to minimize reflectance at the boundaries of otherwise adjacent layers. More particularly, the present invention is directed to methods and apparatus relating to a multilayer display stack comprising a glass layer, a first index matching layer, a first intermediate layer, a second index matching layer, a second intermediate layer, and a light emitting display panel wherein: the glass layer, first index matching layer, first intermediate layer, second index matching layer, and second intermediate layer are each transparent or translucent, and comprise an index of refraction; the index of refraction of the first index matching layer is between the index of refraction of the glass layer and the first intermediate layer; and the index of refraction of the second index matching layer is between the index of refraction of the first intermediate layer and the second intermediate layer. Alternative embodiments may comprise additional index matching layers, additional non-index matching layers, as well as layers other than those described herein.

19 Claims, 1 Drawing Sheet

OPTICAL COMPENSATION OF COVER GLASS-AIR GAP-DISPLAY STACK FOR HIGH AMBIENT LIGHTING

FIELD OF THE INVENTION

The present invention relates generally to flat (Commercial-Off-The-Shelf) COTS display technologies adapted and housed in assemblies for military and other severe environments, apparatus incorporating such assemblies, and methods for forming and using such assemblies.

BACKGROUND OF THE INVENTION

Used in the context of flat panel displays, the term "ruggedized" typically means multiple layers of front glass, diffusers, polarizers, heater glass, and other layers bonded together with the flat panel display. Multiple layers of epoxy, adhesive, optical compounds, and other bonding materials are used to attach the layers. "Ruggedized" flat panel displays are undesirably thick, heavy, and costly. In addition, significant process control and producibility problems lead to low yield and long-lead production schedules. In addition, "ruggedized" flat panel displays often do not satisfactorily meet user requirements due to design problems inherent to the complex stacked, bonded, and layered approach. As such, new packaging techniques and apparatus that provide means for producing lighter, thinner, simpler, less costly, and more reliable display assemblies are very desirable. This disclosure is directed to such new packaging techniques, apparatus and design methods.

SUMMARY OF THE INVENTION

The present invention is directed to apparatus and methods relating to display stacks wherein one or more index matching layers are utilized to minimize reflectance at the boundaries of otherwise adjacent layers. More particularly, the present invention is directed to methods and apparatus relating to a multilayer display stack comprising a glass layer, a first index matching layer, a first intermediate layer, a second index matching layer, a second intermediate layer, and a light emitting or light transmitting display panel wherein: the glass layer, first index matching layer, first intermediate layer, second index matching layer, and second intermediate layer are each transparent or translucent, and comprise an index of refraction; the index of refraction of the first index matching layer is between the index of refraction of the glass layer and the first intermediate layer; and the index of refraction of the second index matching layer is between the index of refraction of the first intermediate layer and the second intermediate layer. Alternative embodiments may comprise additional index matching layers, additional non-index matching layers, as well as layers other than those described herein.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figures 1, 2, 3, 4:
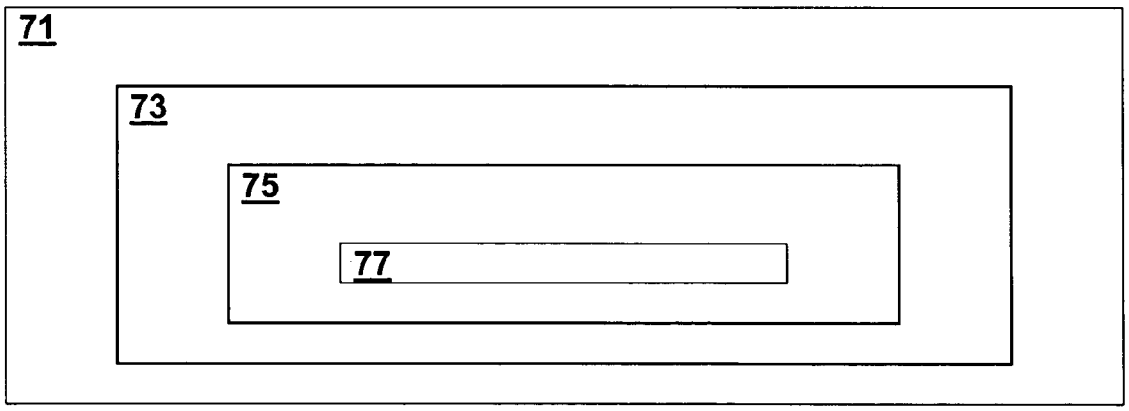
FIG. 1 is a schematic view of a first display stack in accordance with the present invention.
FIG. 2 is a schematic view of a second display stack in accordance with the present invention.
FIG. 3 is a schematic view of a third display stack in accordance with the present invention.
FIG. 4 is schematic view of an apparatus comprising a display in accordance with the present invention.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

It has been determined that lighter, thinner, and less costly display stacks can be formed by not bonding a light emitting or light transmitting display to a glass layer via a plurality of intermediate layers. Instead, an air gap can be provided between the glass layer and display layer. Referring to FIG. 1, a preferred display stack 1 comprises an anti-reflection layer 11, a front cover glass layer 13, a glass to indium tin oxide (ITO) index matching layer 15, a conductive ITO layer 17, an ITO to air index matching layer 19, an air gap layer 21, and a light emitting/transmitting display layer 23.

Without the index matching layers 15 and 19, reflectance of ambient light and/or sunlight can seriously impact the visibility of image bearing light emitted or transmitted by the display layer 23 as any reflected ambient light is superimposed on any images being transmitted by the display with corresponding defocusing and contrast reduction of the transmitted images.

Whenever light is incident on the boundary of two media with different refractive indexes, some light is reflected back into the media the light was originally passing through, and some refracted into the media it was originally traveling towards. The reflected light is a function of the angle of incidence, the polarization and wavelength of the incident light, and the ratio of the refractive index of the two media. For air-glass interfaces, the reflectance is typically about 4% for incidence angles between 0 and 30 degrees, and rises rapidly to 100% reflectance at grazing incidence angles.

In order to decrease reflectance, particularly that between the glass and air gap layers, one or more index matching layers are used to ensure that the ratios between indices of refraction between adjacent layers are kept below a threshold value, where the threshold value is preferably between 0.25 and 1.75, more preferably between 0.45 and 1.55, and most preferably between 0.49 and 1.51. As an example, with an index matching layer in place between a glass layer and an air gap layer, the ratio of the index of the glass layer to that of the index matching layer, and the ratio of the index matching layer to the air gap layer, will each be closer to unity than the ratio of the index of the glass layer to the index of the air gap layer.

It is contemplated that in some instances the difference between the indices of refraction of two adjacent layers may be sufficiently large as to make it difficult or impossible to achieve the desired ratios between adjacent layers if only a single index matching layer is used. As such, in some instances it may be beneficial to utilize multiple index matching layers to "step through" the difference between the indices.

Referring to FIG. 2, a preferred display stack 2 comprises an anti-reflection layer 31, a front cover glass layer 33, a first glass to indium tin oxide (ITO) index matching layer 35, a second glass to ITO index matching layer 37, a conductive ITO layer 39, an ITO to air index matching layer 41, an air gap layer 43, and a display layer 45. Stack 2 differs from stack 1 primarily in regard to the use of multiple index matching layers 35 and 37 between glass layer 33 and ITO layer 39. In stack 2, the index of refraction of layer 35 is between that of layers 33 and 37, and that of layer 37 between that of layers 35 and 39.

It is contemplated that some embodiments may utilize layers in addition to those of stack 1. If additional layers are used, it is preferable to add index matching layers as needed to ensure that the ratios of indices of adjacent layers fall within the desired ranges.

Referring to FIG. 3, a preferred display stack 3 comprises an anti-reflection layer 51, a first conductive ITO layer 53, an ITO to glass index matching layer 55, a front cover glass layer 57, a glass to ITO index matching layer 59, a second conductive ITO layer 61, an ITO to air index matching layer 63, an air gap layer 65, and a display layer 67. Stack 3 differs from stack 1 primarily in regard to the inclusion of an additional ITO layer 53, and a corresponding index matching layer 55 between layers 53 and 57. As has been described, the index of refraction of the index matching layer 55 preferably falls between that of ITO layer 53 and glass layer 57.

Referring to FIG. 4, an apparatus 71 comprises an operator input/output assembly 73, a display apparatus 75 that is part of assembly 73, and a display stack 77 that is part of display apparatus 75. It is contemplated that the display stacks described herein may be advantageously used in a variety of display apparatus 75. Such apparatus may include but are not necessarily limited to active matrix LCDs (AMLCDs), passive matrix LCDs (PMLCDs), and organic light emitting diode (OLED) displays, and any form of commercial off the shelf (COTS) displays. It is also contemplated that the display stacks and/or display apparatus described herein may be included as part of an operator input/output assembly in a variety of apparatus 71. Such apparatus may include but are not necessarily limited to ATMs, industrial operator interface, medical instrumentation, and military applications.

It is preferred that the stacks described herein be able to withstand severe environmental conditions. Such conditions may relate to, among others, operating temperature, storage temperature, temperature shock, humidity, shock, vibration, sand and dust, salt fog, electromagnetic interference, blowing rain, operating pressure, pressure changes, fungal growth, and TEMPEST. As such, preferred stacks are adapted to withstand one or more of the following in any combination: severe vibration, wide operating temperature, electromagnetic interference and sunlight readability. More particularly, preferred stacks are able to withstand severe environmental extreme conditions, including continuous operating and storage temperatures from −55 C to 100 C per MIL-STD-810, sustained 3-axis shock and vibration up to 40 g's per MIL-STD-810, humidity and salt fog typical of navy shipboard environments per MIL-STD-810, sand and dust typical of desert environments per MIL-STD-810, altitudes to 60,000 ft per MIL-STD-810, fungus producing climates, and are able to meet stringent conducted and radiated EMI/EMC per MIL-STD-461, MIL-STD-462, and tempest requirements, all of which are typical for the intended applications.

It is contemplated that different stack embodiments may comprise fewer layers, and/or additional layers than those shown in FIGS. 1–3. It is contemplated any particular layer may comprise a uniform material, a combination of materials, a single piece and/or multiple pieces. Although the actual materials of anti reflection layers 11, 31, and 51 may comprise any reasonable materials or combinations of materials. The glass layers 13, 33, and 57 comprise borofloat, sodalime, Corning 1737, or Corning Eagle 2000. The ITO layers 17, 39, 53, and 61 comprise optically transparent, electrically conductive ITO. The index matching layers 15, 19, 35, 37, 41, 55, 59, and 63 may comprise any materials or combinations of materials.

The air gap layer 21, 43, 65 preferably is 0.05 inches thick to provide an equivalent distance between the ITO index matching layer and the light emitting/transmitting display. It is contemplated that in some embodiments the air gap may be replaced by a gap filled with some other gas or mixture of gasses, by a liquid, or possibly by a solid.

The display layers 23, 45, and 67 preferably comprise a backlit liquid crystal display, but may comprise any other type of display, particularly any other type of COTS light emitting/transmitting display. It is contemplated that the display apparatus described herein may be formed using commercial off the shelf display panels of varying technologies including liquid crystal displays (LCD's), light emitting diode displays (LED's), organic light emitting diodes (OLED's), and other flat panel display technologies available now or anytime in the future. It is also contemplated that the methods and apparatus described herein are particularly well suited for use with flat form and/or panel display technologies The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing examples of some such characterizations.

Embodiments of the present invention may be characterized as a multilayer display stack comprising a glass layer, a first index matching layer, a first intermediate layer, a second index matching layer, a second intermediate layer, and a light emitting/transmitting display panel wherein: the glass layer, first index matching layer, first intermediate layer, second index matching layer, and second intermediate layer are each transparent or translucent, and comprise an index of refraction; the index of refraction of the first index matching layer is between the index of refraction of the glass layer and the first intermediate layer; and the index of refraction of the second index matching layer is between the index of refraction of the first intermediate layer and the second intermediate layer. In some instances it may also be said to have a first intermediate layer that is an electrically and/or thermally conductive, and/or having a first intermediate layer is an indium tin oxide layer. In some instances it may said to have a second intermediate layer that is a gas or liquid layer, and/or that is an air layer.

In some instances embodiments of the present invention may also be said to have an air layer that has a thickness between 0.001 inches and 0.075 inches. In some instances, the present invention may be described in that the index of refraction of any index matching layer is at least X % of the index of refraction of any adjacent layer where X is one of 40, 50, 60, 70, and 80. It may, in some instances, the present invention may also be said to have at least one index matching layer comprising a plurality of index matching sub-layers.

Embodiments of the present invention may, in some instances, be said to comprise a third intermediate layer and a third index matching layer wherein: the third index matching layer is adjacent to the glass layer opposite the first index matching layer; the third intermediate layer is adjacent to the third index matching layer opposite the glass layer; and the third index matching layer has an index of refraction between that of the third intermediate layer and the glass layer.

Embodiments of the present invention may also, in some instances be characterized as a apparatus comprising a multilayer display stack as described herein.

Embodiments of the present invention may also be characterized as a method of forming a multilayer display stack comprising sandwiching at least one index matching layer between two layers having different indices of refraction wherein the at least one index matching layer has an index of refraction between those of the layers it is sandwiched between. In some instances the stack may also be described as comprising at least one air gap and at least one index matching layer is positioned adjacent to the air gap. In some such instances the display stack might comprise a first index matching layer sandwiched between a glass layer and an indium tin oxide layer and a second index matching layer sandwiched between an indium tin oxide layer and an air gap layer. In some instances, the display stack might be said to comprise a light emitting/transmitting display panel adjacent to the air gap layer opposite the second index matching layer.

It is contemplated that the methods and apparatus described herein are particularly well suited for use in combination with the methods and apparatus of co-pending application Ser. No. 10/877,334, having the same inventors as, and filed on or about the same date as, the present application, titled "Non-Ruggedized COTS Display Packaging For Severe Environment Applications", herein incorporated by reference in its entirety.

What is claimed is:

1. A multilayer display stack for mounting over a light emitting or transmitting display, the display stack comprising:
   a glass layer;
   a first index matching layer on the side of the glass layer facing the light emitting display;
   a first intermediate layer on the side of the first index matching layer facing the light emitting display;
   a second index matching layer on the side of the first intermediate layer facing the light emitting display; and
   a second intermediate layer on the side of the second index matching layer facing the light emitting display;
   the index of refraction of the first index matching layer being between the index of refraction of the glass layer and the first intermediate layer; and
   the index of refraction of the second index matching layer being between the index of refraction of the first intermediate layer and the second intermediate layer.

2. The stack of claim 1 wherein the first intermediate layer is electrically conductive.

3. The stack of claim 2 wherein the first intermediate layer is an indium tin oxide layer.

4. The stack of claim 3 wherein the second intermediate layer is a gas or liquid layer.

5. The stack of claim 4 wherein the second intermediate layer is an air layer.

6. The stack of claim 5 wherein the air layer has a thickness between 0.001 and 0.075 inches.

7. The stack of claim 6 wherein the ratio of the index of refraction of any particular index matching layer to the index of refraction of a layer immediately adjacent to the particular index matching layer is between X1 and X2 where X1 and X2 are 0.25 and 1.75.

8. The stack of claim 7 wherein X1 and X2 are 0.45 and 1.55.

9. The stack of claim 8 wherein X1 and X2 are 0.49 and 1.51.

10. The stack of claim 1 wherein the index of refraction of any index matching layer is at least X % of the index of refraction of any adjacent layer where X is one of 40, 50, 60, 70, and 80.

11. The stack of claim 1 wherein at least one of the index matching layers comprises a plurality of index matching sub-layers.

12. A display apparatus comprising a multilayer display stack according to claim 1 wherein the apparatus is an active matrix liquid crystal display, a passive matrix liquid crystal display, or an organic light emitting diode display.

13. An apparatus comprising a multilayer display stack according to claim 1 wherein the apparatus is an automatic teller machine, an industrial operator interface, a medical instrument, or a military operator interface.

14. An apparatus comprising a multiplayer display stack according to claim 1 wherein the ratio between the indices of refraction between any two adjacent layers not including the light emitting or transmitting display area is between 0.25 and 1.75.

15. a multilayer display stack comprising:
   a glass layer,
   a first index matching layer,
   a first intermediate layer,
   a second index matching layer,
   a second intermediate layer,
   a third intermediate layer,
   a third index matching layer; and
   a light emitting a transmitting display panel,
   wherein the glass layer, first index matching layer, first intermediate layer, second index matching layer, and second intermediate layer are each transparent or translucent and have an index of refraction, with the index of refraction of the first index matching layer being between the index of refraction of the glass layer and the first intermediate layer, the index of refraction of the second index matching layer being between the index of refraction of the first intermediate layer and the second intermediate layer, the third index matching layer being adjacent to the glass layer opposite the first index matching layer, the third intermediate layer being adjacent to the third index matching layer opposite the glass layer, and the third index matching layer having an index of refraction between that of the third intermediate layer and the glass layer.

16. The stack of claim 15 wherein the first intermediate layer is electrically conductive.

17. The stack of claim 16 wherein the first intermediate layer is an indium tin oxide.

18. The stack of claim 15 wherein the second intermediate layer is a gas or liquid.

19. The stack of claim 18 wherein the second intermediate layer is air.

* * * * *